United States Patent Office 3,313,193
Patented Apr. 11, 1967

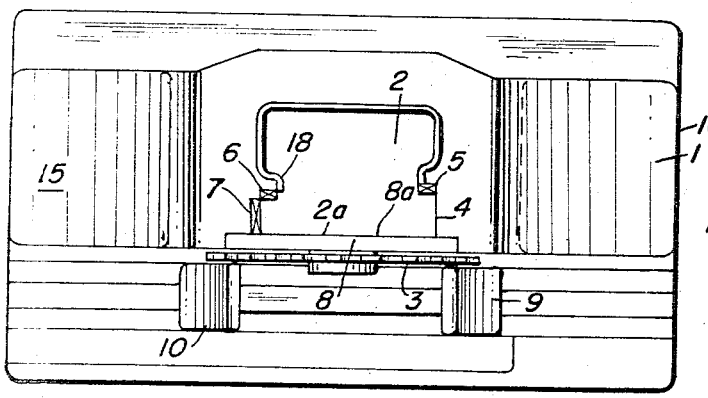
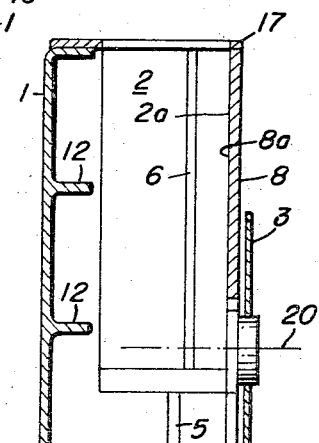
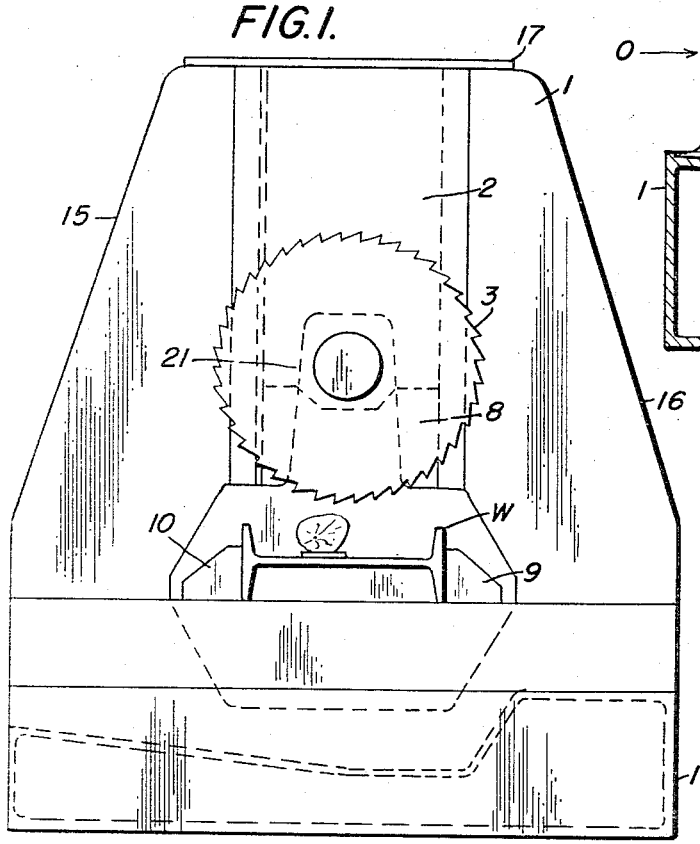
INVENTOR
RODERICH ORENDI

3,313,193
CIRCULAR SAW WITH A VERTICAL TOOL FEED
Roderich Orendi, Reutlingen, Wurttemberg, Germany, assignor to Gustav Wagner Maschinenfabrik, Reutlingen, Wurttemberg, Germany, a corporation of Germany
Filed Apr. 20, 1965, Ser. No. 449,536
Claims priority, application Germany, Apr. 20, 1964, W 36,738
4 Claims. (Cl. 83—488)

The invention relates to a circular saw with a vertical tool feed and more particularly to a circular saw wherein the tool is mounted on a slide movable in vertical ways in the machine frame above the work.

In the design of circular saws it is important to provide a rigid frame in order to reduce vibration and also dispose and feed the tool in relation to the work in an appropriate manner.

Although known circular saws with a lateral tool feed satisfy the requirement of stability and vibration-free operation, the fact that the tool feed must permit the work that is to be cut to be brought into the closest possible proximity with the center of rotation of the saw blade involves the necessity in circular saws with a lateral tool feed, especially when large diameter saw blades are used, to reset the level of the table or of the slide according to the particular height of each workpiece and to adjust the axis of rotation of the saw to the different levels of the upper edges of the work. This applies particularly in the case of the more bulky work because, for cutting the largest possible cross-section, the path of the center of the saw blade must be level with the center of the workpiece cross-section.

In order to overcome this difficulty, circular saws have been designed in which the saw blade is fed to the work vertically from above. To this end the saw blade and its drive means are guided in ways on one or both sides of the machine frame or they are lowered from above downwards on the end of a swinging arm.

The provision of clamping means, which have a centering action on the work, insures that the center of the saw blade always feeds towards the center of the work, irrespective of the cross-section of the work. However, the construction of such machines is not sufficiently stable to avoid the tendency to build up vibrations, particularly when the rate of down-feed against the workpiece is high and especially if the saw blades are hard-metal tipped, and such vibrations may easily lead to tool damage. Rigidity of the ways in these known machines is not achieved in the same way as in horizontally feeding saws in which the weight of the saw slide, as it rests on its slideways, improves stability. Known types of vertical saws, therefore, readily tend to chatter.

In known forms of construction of circular saws with a vertical tool feed the tool is guided on two generally circular columns located alongside the worktable and connected at the top by a bridge to form a frame. If the saw blade is positioned in front of one side of the frame, the cutting forces transmit a tilting, or racking moment to the frame. On the other hand, if the saw blade is positioned between the columns in the plane of the frame, the generation of tilting stresses will be largely avoided but it is then difficult to observe the progress of the cutting operation, which is a serious drawback when the cut is to be made according to a scribed or marked line. Moreover, the maximum diameter of the saw blade is determined by the clearance between the two columns so that either the saw blades must be relatively small and the depth of cut restricted accordingly, or the columns must be spaced widely apart with consequent impairment of the rigidity of the frame.

It is an object of the present invention to provide a circular saw with a vertical tool feed which will permit the tool to be precisely and completely reliably guided in ways in the frame in such a way that the saw blade can be mounted in front of the frame without impairment of the precision of cut by the reaction moments transmitted to the frame by the cutting forces.

According to the present invention this is achieved by the provision of a machine frame in the form of an integral portal frame with an opening large enough for the passage therethrough of the largest workpiece cross-section for which the machine is designed. The front face of the frame has a slot recessed therein, so that the inner faces thereof form the ways for a tool slide. The tool slide, and frame, are formed with matching guide surfaces, at least one of which is in a plane transverse to the saw spindle. In this arrangement the machine frame and the guideways form an absolutely rigid and static structural unit. The reaction of cutting forces of the saw blade act through a very short lever arm on the structural unit, so that the moments are, therefore, small and easily absorbed by the rigid frame.

Preferably the tool slide is arranged to be longer than the feed stroke of the tool. The saw itself is mounted at the bottom end of the slide. The front of the slot above the path of movement of the saw bearings may be covered by a plate in such a way that the inside of the plate forms a further guiding surface for the slide carrying the blade. The bottom edge of this plate may be provided with an upward recess for the reception of the saw blade bearings when the slide is fully raised.

The front plate enables transfer of tilting moments to the forward portions of the frame. The support, which the plate gives to the slide afforded in conjunction with the considerable length of the slide further operate to reduce the leverage arm of all tilting forces and moments that may arise.

An embodiment of the present invention will now be described by way of example, reference being made to the accompanying drawings, in which:

FIG. 1 is a front elevation of a circular saw according to the invention;

FIG. 2 is a plan view of the circular saw according to FIG. 1 with the top plate removed; and FIG. 3 is an elevational section of the left-hand side of the circular saw in FIG. 1.

Referring to the drawings, a slide 2 supporting a circular saw 3 is vertically slidably movable by suitable means (not shown) in a slot formed into the front face of a closed portal-type frame 1. The slide 2 is guided in the slot between one side 4 of the slot and adjustable liners 5, 6 and 7 mounted therein to provide for an easy, yet not loose, sliding fit. The front of the slot is partly closed by a plate 8 bolted over the slot.

A workpiece W, which is to be cut, is introduced into the central opening O of the portal-type frame and clamped on the worktable between jaws 9 and 10. The diameter of the saw blade 3 is of suitable size for cutting a workpiece of maximum cross-section. Precise application of the saw blade to a scribed marking line can be observed exactly. The plane of the saw blade is situated close to the ways for the slide 2 in frame 1. Preferably, the frame additionally is ribbed, as at 12 (FIG. 3) and integrally constructed. The resultant tilting or racking stresses are therefore small and can be taken up readily by the ribbed integral frame 1 without deforming the same or giving rise to vibrations.

The frame itself is defined by side portions 15, 16, and a top plate 17 secured thereto, for example by welding. The slot in which the slide 2 is movable is formed with a pair of projections 18, fitting in a pair of grooves arranged in slide 2, to prevent misalignment of slide 2 within its guideway, and to provide for a short leverage arm for the transfer of tilting forces or moments from the saw blade spindle to the frame.

The saw blade itself is driven by a motor in conventional manner, not shown; the motor, its bearings and the spindle for the saw blade are all mounted on the slide 2; the axis of rotation of the spindle for the blade is shown at 20 (FIG. 3). Inspection of FIG. 3 also shows that the reaction force, that is the upward thrust exerted against the circumferential edge of the blade 3, will be transferred to liner 6 of the slideway wtih a minimum of bending moment. Face 2a of slide 2, bearing against the inner surface 8a of front plate 8 further aids in keeping the slide 2 aligned in its guideways, and in transmitting stresses from the blade and blade spindle 20 to the frame.

The top plate 17 may have a cut-out to permit the slide to extend beyond the length of frame 1. Front plate 8 likewise may have a vertically extending cut-out defined by side walls 21 (FIG. 1), in order to provide a space for the shaft, or spindle and the bearings therefor of saw blade 3 and its associated motor, not shown, and likewise mounted on slide 2 in a conventional manner.

Plate 8 may be secured to the side members 15, 16 of frame 1 in any conventional manner, for example by recessed screws and bolts, not shown, if it is designed for ease of removal; or may be welded on if the shaft of blade 3 can readily be removed so that the slide 2 can be lifted out of the machine vertically. Likewise, top plate 17 may be bolted, welded, or secured in other conventional manners; if the structure of side members 15, 16 and the entire assembly of the unit is rigid enough, plate 17 may be omitted.

I claim:
1. A circular machine saw comprising a vertical frame formed with a portal-like opening for the passage of a workpiece therethrough; said frame having a pair of side members defining a slot therebetween; a slide mounted for sliding movement in said slot; and a circular saw blade, having a spindle mounted on said slide, said spindle being horizontal and mounting said saw blade at a position outside of the opening of said frame and close to the front thereof said members and said slide being formed with matching guide surfaces, one surface extending in a plane transverse to said spindle.

2. A machine as claimed in claim 1, said slide and slide holder being formed with interlocking projections and grooves.

3. Machine as claimed in claim 1, including a front plate secured to said frame, said front plate covering a portion of said slot, said plate forming an auxiliary guiding surface for the upper part of the slide.

4. Machine as claimed in claim 3, the lower edge of the front plate being formed with a recess for reception of the saw blade spindle when said slide, and spindle therewith, is in a fully raised position.

References Cited by the Examiner
UNITED STATES PATENTS

| 742,772 | 10/1903 | Blood | 143—47 |
| 2,365,987 | 12/1944 | Zimmerman | 83—487 X |
| 2,996,025 | 8/1961 | Georgeff. | |

ANDREW R. JUHASZ, *Primary Examiner.*